US011561857B2

United States Patent
Assel et al.

(10) Patent No.: US 11,561,857 B2
(45) Date of Patent: Jan. 24, 2023

(54) METHOD FOR THE SECURED STORING OF A DATA ELEMENT TO BE STORED BY A COMPUTER PROGRAM IN AN EXTERNAL MEMORY

(71) Applicant: Robert Bosch GmbH, Stuttgart (DE)

(72) Inventors: Martin Assel, Markgroeningen (DE); Axel Aue, Korntal-Muenchingen (DE); Matthias Schreiber, Vaihngen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/317,448

(22) Filed: May 11, 2021

(65) Prior Publication Data

US 2022/0027238 A1 Jan. 27, 2022

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673; G06F 11/1048
USPC ....................................................... 714/764
See application file for complete search history.

(56) References Cited

U.S. PATENT DOCUMENTS

| | | | | |
|---|---|---|---|---|
| 7,334,179 B2* | 2/2008 | Zhang | ............... | G06F 11/1008 714/763 |
| 8,281,222 B2* | 10/2012 | Henry | ................ | G06F 11/10 714/764 |
| 2013/0198571 A1* | 8/2013 | Brewerton | .......... | G06F 11/1645 714/37 |
| 2015/0331742 A1* | 11/2015 | Liang | ................. | G06F 11/1068 714/764 |
| 2015/0331745 A1* | 11/2015 | Zastrow | ............. | G06F 11/1048 714/764 |
| 2016/0034349 A1* | 2/2016 | Choi | ...................... | G11C 29/26 714/764 |
| 2016/0203047 A1* | 7/2016 | No | ...................... | G06F 11/1048 714/764 |

(Continued)

*Primary Examiner* — Albert Decady
*Assistant Examiner* — Enam Ahmed
(74) *Attorney, Agent, or Firm* — Norton Rose Fulbright US LLP; Gerard Messina (57) ABSTRACT

A method for the secured storing of a data element to be stored by a computer program in an external memory, which is connected to a microcontroller, the microcontroller including an interface module, which is configured to calculate error correction values for data elements including, when creating the computer program, during a determination of memory addresses of the computer program, determining a memory address in the external memory for the data element, a shared memory space requirement of data element and associated error correction value being taken into account; and during execution of the computer program, receiving the data element by the interface module; calculating an error correction value for the data element by the interface module; and writing, starting at the memory address, the data element and immediately thereafter the calculated error correction value within one addressing phase by the interface module.

6 Claims, 2 Drawing Sheets

(56) References Cited

U.S. PATENT DOCUMENTS

| | | | | |
|---|---|---|---|---|
| 2016/0342473 A1* | 11/2016 | Healy | ............ | H03M 13/618 |
| 2020/0363991 A1* | 11/2020 | Lee | ............ | G06F 3/0659 |
| 2021/0049068 A1* | 2/2021 | Schaefer | ............ | G06F 11/1048 |
| 2021/0406171 A1* | 12/2021 | Beaudoin | ............ | G11C 29/42 |

* cited by examiner

METHOD FOR THE SECURED STORING OF A DATA ELEMENT TO BE STORED BY A COMPUTER PROGRAM IN AN EXTERNAL MEMORY

CROSS REFERENCE

The present application claims the benefit under 35 U.S.C. § 119 of German Patent Application No. DE 102020209136.6 filed on Jul. 21, 2020, which is expressly incorporated herein by reference in its entirety.

FIELD

The present invention relates to a method for the secured storing of a data element to be stored by a computer program in an external memory and to a microcontroller and to a processing unit for carrying out the method.

BACKGROUND INFORMATION

In working memories such as SRAM, Flash, PCM or DRAM, it is possible, in addition to the data bits, to store further bits for correcting errors or identifying errors, referred to as "Error Correction Code," in order to secure the data content. Single bit errors or multi-bit errors within a data element may thus be identified and corrected as a function of the number of the bit errors within the data element.

In embedded systems, for example, control units of machines or vehicles, so-called microcontrollers are used which include, in addition to one or multiple processor cores, a particular limited amount of internal working memory, in which programs and data are stored during execution. For this working memory, in particular, for safety-critical applications, for example, in motor vehicles, an error correction method may be implemented in the microcontroller with the aid of ECC.

Typical SRAM memory cells used as working memories in microcontrollers include 6 transistors and are accordingly relatively expensive and complex to manufacture, hence, the working memory integrated in the microcontroller is frequently dimensioned only large enough to be sufficient for basic applications. An internal expandability of the working memory is usually not provided or is not possible in microcontrollers for reasons of cost, since the working memory is integrated with the processor cores in one chip.

In order to also enable the implementation of applications, which access a working memory larger than is provided on the microcontroller, it is possible to connect an external memory via a communication interface, for example, an SPI interface (Serial Peripheral Interface). This external working memory may be cost-efficiently designed in the form of DRAM memory cells that require only one transistor. However, no error correction function is implemented in available externally connectable working memories.

SUMMARY

According to the present invention, a method for the secured storing of a data element to be stored by a computer program in an external memory and a microcontroller and a processing unit for carrying out the method are provided. Advantageous embodiments of the present invention are described herein.

The present invention is based on the measure that when creating the computer program, i.e., in particular, when determining or assigning the (physical) memory address for the data element to be stored, for example, in the so-called linker or locator, a shared memory space requirement of the data element and an associated error correction value is taken into account, i.e., in other words, corresponding space between successive data elements is left open. Thus, the physically "reserved" memory space between two successive memory addresses for data elements is so large that it is able to accommodate both a data element as well as an error correction value, even though in the program code itself only the data element is stored. The error correction value is than added during operation by an interface module of the microcontroller.

Accordingly, the data element and the associated error correction value (hereinafter also ECC value) are written according to the method provided by the interface module within a single addressing phase of the memory, an independent address calculation for determining a memory address for the ECC value and a further longer address access during an independent addressing phase for the ECC value are omitted. This is advantageous, since memory access times with respect to a handling of data elements and ECC values independent of one another are reduced as a result.

As explained, the calculation of the ECC value is carried out by the interface module during the execution of the computer program. This module is designed as a hardware module of the microcontroller. A corresponding functionality which is implemented in the processor core or as software is unnecessary. Accordingly, a modification of existing processor cores or software is not necessary.

The determining of the memory address in the external memory or the determination of the memory addresses of the computer program takes place during the creation of the computer program, it being preferred that the determining of the memory address or the determination of the memory addresses of the computer program takes place via a programming tool, in particular, via a linker or a locator, which maps logical memory addresses contained in a computer program code of the computer program or in a compiled or assembled binary code or object code of the computer program code in memory addresses of the external memory.

Computer program code or software is understood here to mean a code written by the programmer in a programming language (for example, in C or Assembler), which implements the function of the computer program. The object code obtained from this computer program code via compilation and/or assembly is assembled during the creation of the computer program, symbols in the object code, in particular, which refer, for example, to data elements, being assigned memory addresses. Memory addresses of the computer program are thus determined. This takes place via a so-called linker. In microcontrollers that are used in the field of embedded applications, computer programs and data elements are typically stored at absolute—relative to the address space of the microcontroller—addresses. If the linker generates only relative addresses, a so-called locator is also used, which converts the relative addresses into absolute addresses.

An arbitrary suitable error correction method, for example, a Hamming code, may be used as an error correction method or error identification method for calculating the ECC value. Such methods are conventional to those skilled in the art.

The external memory connected via the interface module may be, in particular, a volatile memory, which is used by the microcontroller as a working memory, i.e., a DRAM memory (DRAM, Dynamic Random Access Memory). The application of the method in a non-volatile memory is also possible, however.

"Addressing phase" is understood here to mean a memory access (writing or reading) in which, starting with a start address, a particular number of successive bits (or bytes) (i.e., to be stored or stored at successive addresses) is written or read. The start address is referred to as the memory address of the corresponding data.

Reference is made within the scope of this application to a data element to be stored. It is clear, however, that the method according to the present invention may also be applied to multiple data elements to be stored (the steps to be carried out during execution of the computer program each being applied to different data elements). A data element may thus be understood to mean at least one data element.

The method preferably includes a read operation of the data element, which includes a reading of the data element and of the ECC value, starting at the memory address, a calculation of an error correction comparison value (hereinafter also ECC comparison value) for the read data element by the interface module and a comparison by the interface module of the ECC comparison value with the read ECC value, in order to establish whether these are the same or not the same. The read operation further preferably includes a transmission of the read data element by the interface module if the ECC comparison value and the read ECC value are the same, and a transmission of a data element corrected on the basis of the read data element and of the read ECC value if the ECC comparison value and the read ECC value are not the same. Using these method steps, it is possible to identify and, if necessary, correct memory errors encountered during reading.

The read address of the data element preferably includes, via the interface module, receiving a changed sub-data element of the read data element, forming a changed data element from the changed sub-data element and from the unchanged portions of the read data element, calculating a changed error correction value based on the changed data element, and writing, starting at the memory address, the changed data element and immediately thereafter the calculated changed error correction value within one addressing phase. In this way, a read-write operation is implemented, with the aid of which, for example, so-called "read-modify-write" commands may be implemented. The modified or changed part of the read data word is inserted by the interface module into the read data word and a recalculation of the error correction value is also carried out by the interface module. These steps are not visible or transparent from the perspective of the software, so that they do not have to be adapted.

A microcontroller according to an example embodiment of the present invention includes an interface module, which is configured to receive a data element and a memory address for the data element, to calculate an ECC value for the received data element and to write the data element and the associated ECC value to the received memory address in an external memory within one addressing phase. The microcontroller is thus configured to carry out a write operation corresponding to the method, which takes place during the execution of the computer program. The microcontroller is further preferably configured to carry out a read operation according to the method according to the present invention.

A processing unit according to an example embodiment of the present invention, for example, a control unit of a motor vehicle, includes a microcontroller according to the present invention, the processing unit preferably including an external memory, which is connected to the microcontroller via the interface module.

The present invention is suitable, in particular, for so-called "Embedded Systems." These are understood to mean electronic computers, which are integrated (embedded) into a technical context. The computer in this case assumes either monitoring, controlling or regulating functions or is responsible for a form of the data processing or signal processing, for example, during encryption and decryption, coding or decoding or filtering. A typical requirement of embedded systems is the real-time capability. A processing at an unpredictable processing speed may not be tolerated. Many applications (in particular, controllers in safety-relevant systems—i.e., systems, via which a human could be endangered, injured or even killed) require a system with a predictable reaction time.

Further advantages and embodiments of the present invention result from the description herein and the figures.

The present invention is schematically represented in the figures based on exemplary embodiments and is described below with reference to the figures.

DETAILED DESCRIPTION OF EXAMPLE EMBODIMENTS

Figure 1A:
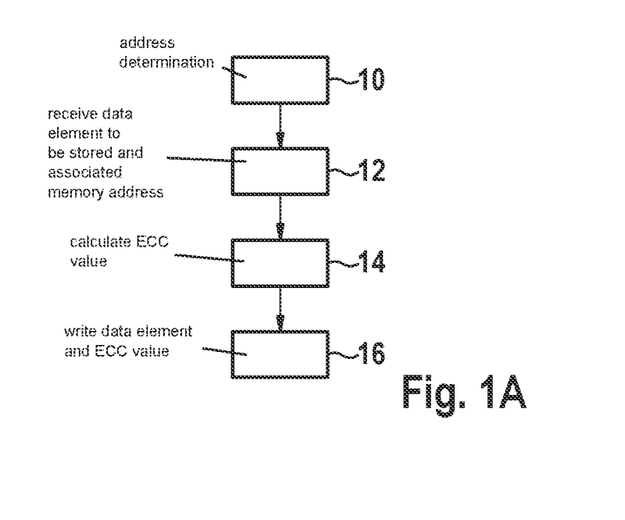
FIG. 1A shows a flowchart of a write operation according to one preferred specific embodiment of the method for secured storing of the present invention.

FIG. 1A represents a flowchart of a write operation for the secured storing of a data element in an external memory connected to a microcontroller according to one preferred specific embodiment of the present invention. In the further description below (also in the additional figures), reference is made, in particular, to a data element and to an ECC value, this reference is for the purpose of language simplification and is to be read as meaning at least one data element and at least one ECC value. The present invention is therefore not restricted to one single data element.

The data element may be both program data, i.e., program instructions, as well as data that are used and, if necessary, changed by the computer program. In the method, an interface module is used, via which the external memory is connected to the microcontroller. The interface module is configured to carry out error correction calculations.

In step 10, an address determination takes place, in which a memory address for the data element to be stored is determined. In this address determination, a necessary memory space for an error correction value (ECC value), in addition to the necessary memory space for the data element, is taken into account, the address determination being carried out in such a way that the ECC value is situated directly following the data element. In the address determination, therefore, corresponding memory space is reserved for the data element and for the associated ECC value. The address determination is carried out during the creation of the computer program, more precisely, during a determination of memory addresses of the computer program, preferably by a linker and/or locator used in such case. The ECC value is not visible from the perspective of the computer program code (for example, of a program code written in C or Assembler), i.e., from the perspective of the programmer, or of the compiled or assembled computer program code.

During the execution of the computer program, the data element to be stored and the associated memory address are received by the interface module in step 12, and in step 14, the ECC value belonging to the data element is calculated. Both steps 12, 14 are carried out by the interface module.

In step 16, which is also carried out by the interface module, the data element and the ECC value are written during a single addressing phase to the received memory address into the memory, i.e., the data element is written, starting at the received memory address, and the ECC value is written immediately following the data element. A calculation of an independent memory address for the ECC value is therefore not necessary.

Figure 1B:
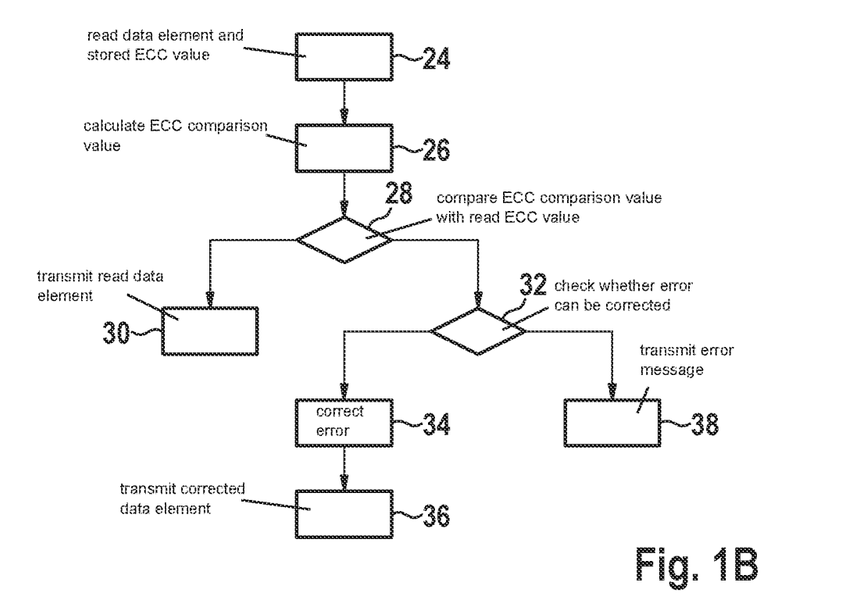
FIG. 1B shows a flowchart of a read operation according to one preferred specific embodiment of the method for secured storing of the present invention.

FIG. 1B represents a flowchart of a read operation according to one preferred specific embodiment of the present invention.

After receipt of a read request containing a memory address by the interface module, the data element and the immediately subsequently stored ECC value are read from the memory in step 24, starting at the received memory address. This takes place again within a single addressing phase, a separate addressing phase for reading out the ECC value is not necessary.

In step 26, an error correction comparison value (ECC comparison value) from the read data element is calculated by the interface module. This ECC comparison value is compared in step 28 with the read ECC value, i.e., with the ECC value valid during the writing of the data element. In the comparison, it is established whether the data element has been changed, thus, whether a memory error has occurred.

If the ECC comparison value is the same as the ECC value, i.e., if (in terms of the error correction method used) no memory error has occurred, the read data element is transmitted, in particular, to the at least one processor core of the microcontroller, step 30.

If the ECC comparison value is not the same as the ECC value, i.e., if a memory error has occurred, it is initially checked in step 32 whether the error may be corrected. Whether this is possible depends on the error correction method used, with which the ECC value is calculated. If, for example, an 8-bit long ECC value is used for a 64-bit long data element, typically 1-bit errors may be identified and corrected and 2-bit errors may be identified but not corrected.

If it is established that the error may be corrected, the error is corrected in step 34, i.e., a corrected data element is determined. The corrected data element is transferred in step 36 to the at least one processor core of the microcontroller. If, on the other hand, it is established that the error may not be corrected, a corresponding error message is transmitted in step 38 to the at least one processor core of the microcontroller.

Figure 2:
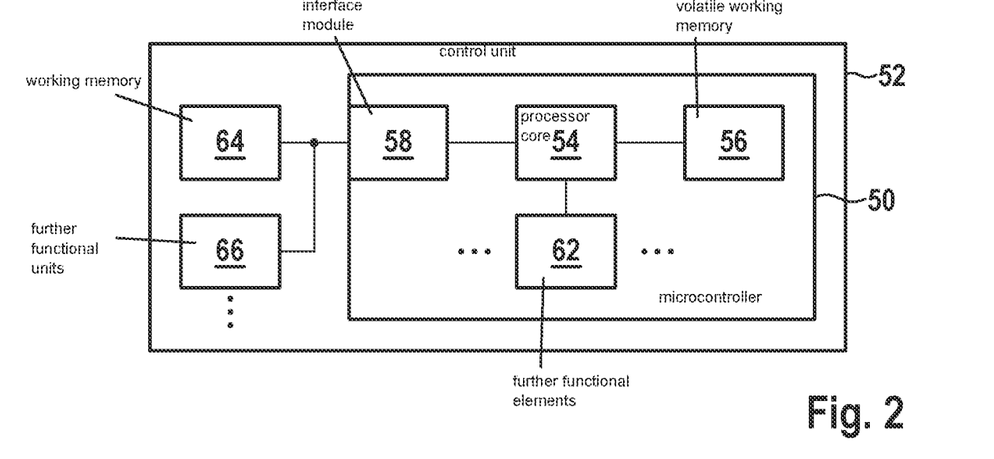
FIG. 2 shows a microcontroller, which may be preferably used for implementing the method according to the present invention.

During the write operation (FIG. 1A) or during the read operation (FIG. 1B), the calculation of the ECC value (step 14) and of the ECC comparison value (step 26) are carried out by the interface module, cf. FIG. 2. A change of the design or of the hardware of the processor core (or of the processor cores) is therefore not necessary. Computer programs may also be used or programmed without the need for knowledge about the interface module and the error correction method.

FIG. 2 represents a microcontroller 50, which may be used to carry out the method according to the present invention. Microcontroller 50 is integrated here by way of example in a control unit 52, for example, of a motor vehicle or of a machine controller. Microcontroller 50 includes at least one processor core 54, a (internal) volatile working memory 56 (DRAM, Dynamic Random Access Memory) connected thereto and an interface module 58 also connected to processor core 54. "Connected" is to be understood here and in the following as meaning a communication link for exchanging data, conductive connections are typically provided for this purpose, however, wireless connections (for example, radio or light) are also possible. The connections may be point-to-point connections or may be implemented via a bus; in each case serial or parallel communication may be provided. The three functional elements (processor core, working memory, interface) may be implemented as an integrated circuit in a single chip.

The at least one processor core 54 is configured to execute computer programs. The computer programs and data required and/or accruing during their execution are stored in working memory 56. Interface module 58 is used for the exchange of data between microcontroller 50 and external devices or functional units. Interface module 58 may include a serial or parallel interface, for example, an SPI interface (SPI, Serial Peripheral Interface, originally introduced by Motorola) or a refinement of the same. Interface module 58 is designed as a hardware module and is used in the error correction method, i.e., the interface module is configured to calculate error correction values and, if necessary, to correct erroneous read data elements on the basis of the error correction values (in the case of a memory error identified according to the error correction method).

The microcontroller may include further functional elements 62 connected to the processor core, for example, a non-volatile memory (for example, flash memory) or further interfaces (for example, a CAN bus interface). Further connections not shown between the individual functional elements may also be provided, for example, a direct connection between working memory 56 and interface module 58.

Also represented in FIG. 2 is an external working memory 64 not included in the microcontroller, which is connected to interface module 58. Further functional units 66 may also be connected via interface module 58 or via further interfaces to microcontroller 58 (in addition or alternatively to corresponding functional elements 62 in the microcontroller). Examples are again a non-volatile memory or further interfaces (for example, a CAN bus interface for communication between the control unit and other elements of the device that is controlled by the control unit).

The working memory, which microcontroller 50 or its processor core 54 is able to access, may be expanded by external (volatile) working memory 64. Thus, programs or their data may be stored at least partially in the external working memory during execution, for example, if the programs are too large for internal working memory 56. Although the access to external working memory 64 is slower than to internal working memory 56, the access is still significantly faster however than the access to a non-volatile memory in which the programs are permanently stored.

Memory accesses to external working memory 64 take place via interface module 58. In the case of a write access, an associated error correction value (ECC value), which is also to be stored in the external working memory, is calculated by interface module 58 for each data element to be stored. The address determination, i.e., the determination of the (physical) memory address in external working memory 64 at which the data element is to be stored, is carried out before the execution of the computer program, in particular, during its creation. In this determination, both the (physical) memory address as well as the memory space requirement are calculated, in the case of the memory space requirement, the space requirement of the data element (for example, 64 bits) and of the associated ECC value (for example, 8 bits) being taken into account (for example, a total of 72 bits).

During writing, the data element is written to the memory address and the ECC value is written immediately thereafter, an independent address calculation for the ECC memory address, i.e., the memory address to which the ECC value is written, is therefore not necessary. In principle, the ECC memory address may be determined from the memory address and from the data element or its length to which the ECC value is written. In addition to the omission of an independent address calculation for the ECC value, it is also advantageous that the writing and, if necessary, the later reading of the data element and of the associated ECC value may be carried out normally within one burst access of the external working memory. A so-called "Burst Mode" is implemented in ordinary DRAM memories that are used as working memories, in this case, data stored in a memory row are written or read in direct succession so that the provision of further data contained in a memory row requires very little time as opposed to the provision of the first data contained in the memory row, since the memory row does not have to be reactivated (typical row lengths are 512 bytes, 1 Kbytes, 2 Kbytes).

Since the address determination takes place before the execution of the computer program (for instance, at program creation) and the calculation of the ECC value is carried out by the interface module, it is possible to program the computer program code or the software without knowledge of the error correction, i.e., the program does not have to be adapted.

Figure 3A:
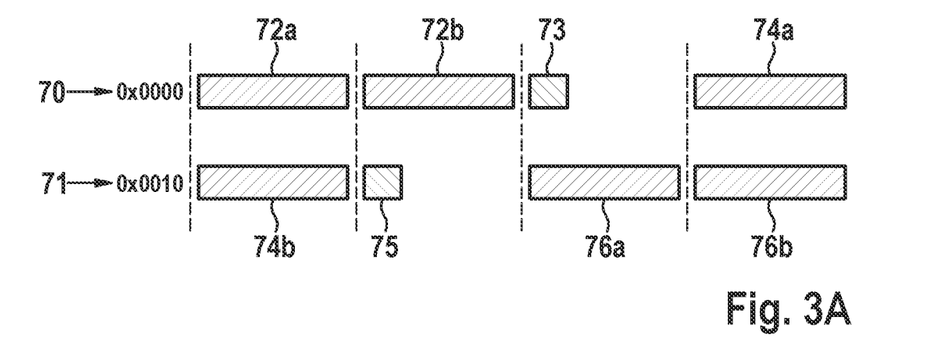
FIGS. 3A and 3b show an example of the physical arrangement or the arrangement from the perspective of the computer program of multiple data elements together with associated ECC values, as it is achieved by the present invention, in accordance with an example embodiment.
Figure 3B:
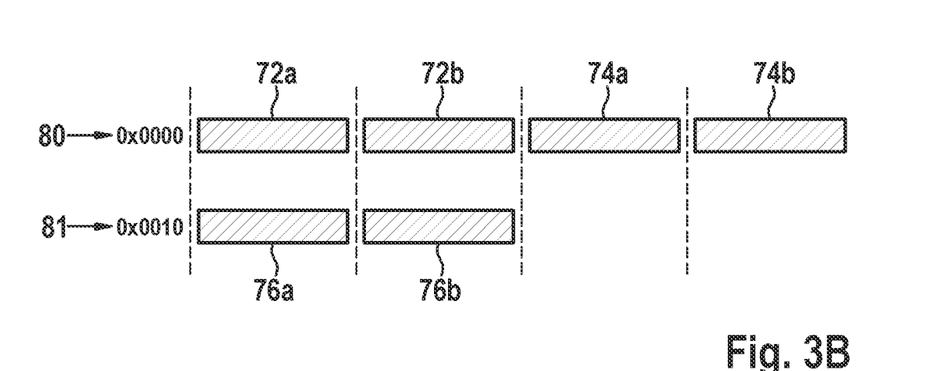

FIGS. 3A and 3B represent by way of example the physical and the logical arrangement of multiple data elements together with associated ECC values, as it is achieved by the present invention. In this case, 64-bit data elements and 8-bit ECC values are shown by way of example. In contrast to this example, the data elements and the ECC values may in general have an arbitrary length. For example, the data elements may have a length of 8, 16, 32, 64, 128 bits, to name a few typical values. Similarly, the ECC values may also have other lengths, for example, 4, 8 or 16 bits, this depends on the ECC method used and may depend on the length of the data elements (for example, 1-bit ECC value length for each 8-bit data element length) or may also be independent thereof. A length of the ECC value of, for example, 8 bits (or of another invariably the same length) may also always be provided; typical combinations are then 8-bit data element+8-bit ECC value, 16-bit data element+8-bit ECC value, 32-bit data element+8-bit ECC value and 64-bit data element+8-bit ECC value.

FIG. 3A represents in this case the actual physical arrangement of three data elements 72a, 72b, 74a, 74b, 76a, 76b and associated ECC values (error correction values) 73, 75 for the first two of the data elements in the external memory. For third data element 76a, 76b, the associated ECC value in the memory detail shown is no longer included and accordingly no longer shown. FIG. 3B represents the arrangement of the same data elements 72a, 72b, 74a, 74b, 76a, 76b from the perspective of the computer program code or of the compiled or assembled computer program code, also referred to as logical arrangement or memory addresses. The data elements in both figures are provided with the same reference numerals in order to allow for a simple assignment. Further data elements not shown including associated ECC values may of course also be stored in the memory.

Two successive physical memory sections 70, 71 and two successive logical memory sections 80, 81, each of which begin at hexadecimal addresses 0x0000 and 0x0010, are shown by way of example. These memory sections serve merely as an example, other addresses are equally possible; the logical addresses may also differ from the physical addresses. Each hexadecimal address corresponds to one-byte (8 bits) and 4-byte sections, respectively, i.e., 32-bit sections, are indicated by dashed lines. Three 64-bit data elements are stored. First data element 72a, 72b is stored, starting at the physical address (see FIG. 3A) 0x0000, the 64 bits of the first data element being plotted as two 32-bit elements 72a, 72b. First data element 72a, 72b is followed immediately, i.e., starting at physical memory address 0x0008, by associated ECC value 73, which may have a length of 8 bits, for example.

Second 64-bit data element 74a, 74b starts in this example at physical memory address 0x000C and again includes two 32-bit elements 74a, 74b. It should be noted here that 32-bit elements in this example are aligned with 32-bit sections in the working memory. If the ECC value is shorter than 32 bits, a section in the memory accordingly remains open (in the case of an 8-bit ECC value, for example, the section from 0x0009 to 0x000B remains open). ECC value 75 belonging to the second data element is stored immediately after second data element 74a, 74b, i.e., at physical memory address 0x0014. Third 64-bit data element 76a, 76b is stored at physical memory address 0x0018 (to 0x001F). Its ECC value is stored at physical memory address 0x0020, which is no longer represented in the memory section shown in FIG. 3A.

Using this arrangement in the external memory, the 64-bit data elements and the associated ECC values may be written or read, in each case using merely the respective memory address (0x0000 and 0x000C in the example of FIG. 3A). This means, data element and associated ECC value form, so to speak, a composite data element, which may be addressed with the aid of a single memory address and may thus be written or read in a single addressing phase. An addressing phase related to the first data element would involve here, starting for example, at memory address 0x0000, 9 bytes (72 bits=64-bit data element+8-bit ECC value), i.e., addresses 0x0000 to and including 0x0008.

FIG. 3B shows the corresponding logical arrangement in memory sections 80, 81 of the three 64-bit data elements, i.e., the arrangement from the perspective of the computer program code or of the compiled or assembled executable computer program code. Here, data elements 72a, 72b, 74a, 74b, 76a, 76b are situated immediately following one another. First data element 72a, 72b is stored at logical memory address 0x0000, i.e., it occupies addresses 0x0000 through 0x0007. Second data element 74a, 74b is stored at logical memory address 0x0008 (0x0008 through 0x000F). Third data element 76a, 76b is stored at logical memory address 0x0010 (0x0010 through 0x0017) The ECC values and accordingly, the securing of the storing of data elements are no longer visible from the perspective of the computer program code or of the compiled or assembled computer program code. An adaptation of the same is thus not necessary.

What is claimed is:

1. A method for secured storing of a data element in an external memory during execution of a linked version of a computer program, the external memory being connected to a microcontroller, the microcontroller including an interface module which is configured to calculate an associated error correction value for the data element, the method comprising:
 during a creation of the computer program which occurs prior to the execution of the computer program, a linker or locator processing a compiled or assembled version of the computer program to produce the linked version of the computer program, wherein:
  the compiled or assembled version of the computer program includes a reference to the data element with no reference to the error correction value;
  the processing by the linker or locator includes, based on the reference to the data element in the compiled or assembled version of the computer program, assigning to the data element a memory address in the external memory and a contiguous block of memory in the external memory that begins at the assigned memory address such that the contiguous block of memory is large enough to store both the data element and the associated error correction value;
 during execution of the linked version of the computer program:
  receiving the data element and the assigned memory address by the interface module;
  calculating the associated error correction value for the data element by the interface module; and
  writing in the contiguous block of memory, starting at the received assigned memory address, both the data element and immediately thereafter the calculated associated error correction value within one addressing phase by the interface module;
 performing, by the interface module, a read operation of the data element, the read operation including:
  reading the data element and the associated error correction value starting at the assigned memory address;
  calculating an error correction comparison value for the read data element; and
  comparing the error correction comparison value with the read error correction value;
 performing, by the interface module, a transmission based on a result of the comparison;
 receiving, by the interface module, a changed sub-data element of the read data element;
 forming, by the interface module, a changed data element from the changed sub-data element and from unchanged portions of the read data element;
 calculating, by the interface module, a changed error correction value based on the changed data element; and
 writing, by the interface module and starting at the assigned memory address, the changed data element and immediately thereafter the calculated changed error correction value within one addressing phase.

2. The method as recited in claim 1, wherein the transmission includes:
 transmitting the read data element when the error correction comparison value and the read error correction value are the same; and
 transmitting a data element corrected based on the read data element and of the read error correction value when the error correction comparison value and the read error correction value are not the same.

3. The method as recited in claim 1, wherein the linker or locator maps logical memory addresses contained in the compiled or assembled version of the computer program into physical memory addresses in the external memory.

4. A microcontroller comprising an interface module, wherein:
 the interface module is configured to perform a method for secured storing in an external memory a data element using an error correction value associated with the data element during execution of a linked version of a computer program that is produced by a linker or locator processing a compiled or assembled version of the computer program;
 the compiled or assembled version of the computer program includes a reference to the data element with no reference to the error correction value;
 the processing by the linker or locator includes, based on the reference to the data element in the compiled or assembled version of the computer program, assigning to the data element a memory address in the external memory and a contiguous block of memory in the external memory that begins at the assigned memory address such that the contiguous block of memory is large enough to store both the data element and the associated error correction value;
 the method for the secured storing includes, during the execution of the linked version of the computer program:
  receiving, by the interface module, the data element and the assigned memory address;
  calculating, by the interface module the associated error correction value for the received data element; and
  writing, by the interface module and in the contiguous block of memory starting at the received assigned memory address, both the data element and immediately thereafter the calculated associated error correction value within one addressing phase; and
 the interface module is configured to:
  perform a read operation of the data element that includes:
   reading the data element and the associated error correction value starting at the assigned memory address;
   calculating an error correction comparison value for the read data element; and
   comparing the error correction comparison value with the read error correction value;
  perform a transmission based on a result of the comparison;
  receive a changed sub-data element of the read data element;
  form a changed data element from the changed sub-data element and from unchanged portions of the read data element;
  calculate a changed error correction value based on the changed data element; and write, starting at the assigned memory address, the changed data element and immediately thereafter the calculated changed error correction value within one addressing phase.

5. A processing unit comprising a microcontroller that includes an interface module, wherein:
the interface module is configured to perform a method for secured storing in an external memory a data element using an error correction value associated with the data element during execution of a linked version of a computer program that is produced by a linker or locator processing a compiled or assembled version of the computer program;
the compiled or assembled version of the computer program includes a reference to the data element with no reference to the error correction value;
the processing by the linker or locator includes, based on the reference to the data element in the compiled or assembled version of the computer program, assigning to the data element a memory address in the external memory and a contiguous block of memory in the external memory that begins at the assigned memory address such that the contiguous block of memory is large enough to store both the data element and the associated error correction value;
the method for the secured storing includes, during the execution of the linked version of the computer program:
receiving, by the interface module, the data element and the assigned memory address;
calculating, by the interface module the associated error correction value for the received data element; and
writing, by the interface module and in the contiguous block of memory starting at the received assigned memory address, both the data element and immediately thereafter the calculated associated error correction value within one addressing phase; and
the interface module is configured to:
perform a read operation of the data element that includes:
reading the data element and the associated error correction value starting at the assigned memory address;
calculating an error correction comparison value for the read data element; and
comparing the error correction comparison value with the read error correction value;
perform a transmission based on a result of the comparison;
receive a changed sub-data element of the read data element;
form a changed data element from the changed sub-data element and from unchanged portions of the read data element;
calculate a changed error correction value based on the changed data element; and
write, starting at the assigned memory address, the changed data element and immediately thereafter the calculated changed error correction value within one addressing phase.

6. The processing unit as recited in claim 5, further comprising the external memory, wherein the external memory is connected to the microcontroller via the interface module.

* * * * *

UNITED STATES PATENT AND TRADEMARK OFFICE
CERTIFICATE OF CORRECTION

| | |
|---|---|
| PATENT NO. | : 11,561,857 B2 |
| APPLICATION NO. | : 17/317448 |
| DATED | : January 24, 2023 |
| INVENTOR(S) | : Martin Assel et al. |

It is certified that error appears in the above-identified patent and that said Letters Patent is hereby corrected as shown below:

On the Title Page

Add Item (30) Foreign Application Priority Data
-- July 21, 2020 (DE) 10 2020 209 136.6 --

Signed and Sealed this
Seventh Day of March, 2023

Katherine Kelly Vidal
*Director of the United States Patent and Trademark Office*